United States Patent [19]
Vickell et al.

[11] Patent Number: 5,676,846
[45] Date of Patent: Oct. 14, 1997

[54] PROCESS FOR THE DETOXIFICATION OF EFFLUENTS CONTAINING FREE OR COMPLEXED CYANIDES

[75] Inventors: Gregg A. Vickell, Burlington, Canada; Roy Norcross, Norwalk, Conn.; Jaganmay Chattopadhyay, Paramus, N.J.

[73] Assignee: Degussa Corporation, Ridgefield Park, N.J.

[21] Appl. No.: 648,619

[22] Filed: May 16, 1996

[51] Int. Cl.$^6$ ............................................. C02F 1/72
[52] U.S. Cl. ................................. 210/759; 210/904
[58] Field of Search ............................. 210/759, 904

[56] References Cited

U.S. PATENT DOCUMENTS

| | | | |
|---|---|---|---|
| 3,617,567 | 11/1971 | Mathre | 210/50 |
| 4,132,589 | 1/1979 | Christensen | 162/65 |
| 4,207,199 | 6/1980 | Perner et al. | 252/174.13 |
| 4,361,486 | 11/1982 | Hou et al. | 210/722 |
| 4,416,786 | 11/1983 | Knorre et al. | 210/746 |
| 4,822,496 | 4/1989 | Griffiths et al. | 210/721 |
| 4,851,129 | 7/1989 | Griffiths et al. | 210/695 |
| 4,915,849 | 4/1990 | Griffiths | 210/759 |
| 4,966,715 | 10/1990 | Ahsan et al. | 210/721 |
| 5,068,038 | 11/1991 | Fischer et al. | 210/662 |
| 5,246,598 | 9/1993 | Proulx et al. | 210/759 |
| 5,262,136 | 11/1993 | Smith et al. | 423/29 |

OTHER PUBLICATIONS

Hoss et al., Atmospheric Environment, vol. 25A, No. 8, pp. 1715–1717 (1991).
Gold Metallurgy in South Africa, published by CTP Bookprinters, Edited by R.J. Adamson, South Africa 1983, pp. 106–109.

*Primary Examiner*—Neil McCarthy
*Attorney, Agent, or Firm*—Beveridge, DeGrandi, Weilacher & Young L.L.P.

[57] ABSTRACT

A process for treating effluent containing cyanide by contacting the effluent with a mixture formed from a source of hydrogen peroxide and a source of magnesium ion to oxidize the cyanide. The ratio of hydrogen peroxide to cyanide is up to 10:1 and the amount of magnesium ion is present in the concentration of 0.1 to 1000 ppm per liter of aqueous waste effluent.

11 Claims, 1 Drawing Sheet

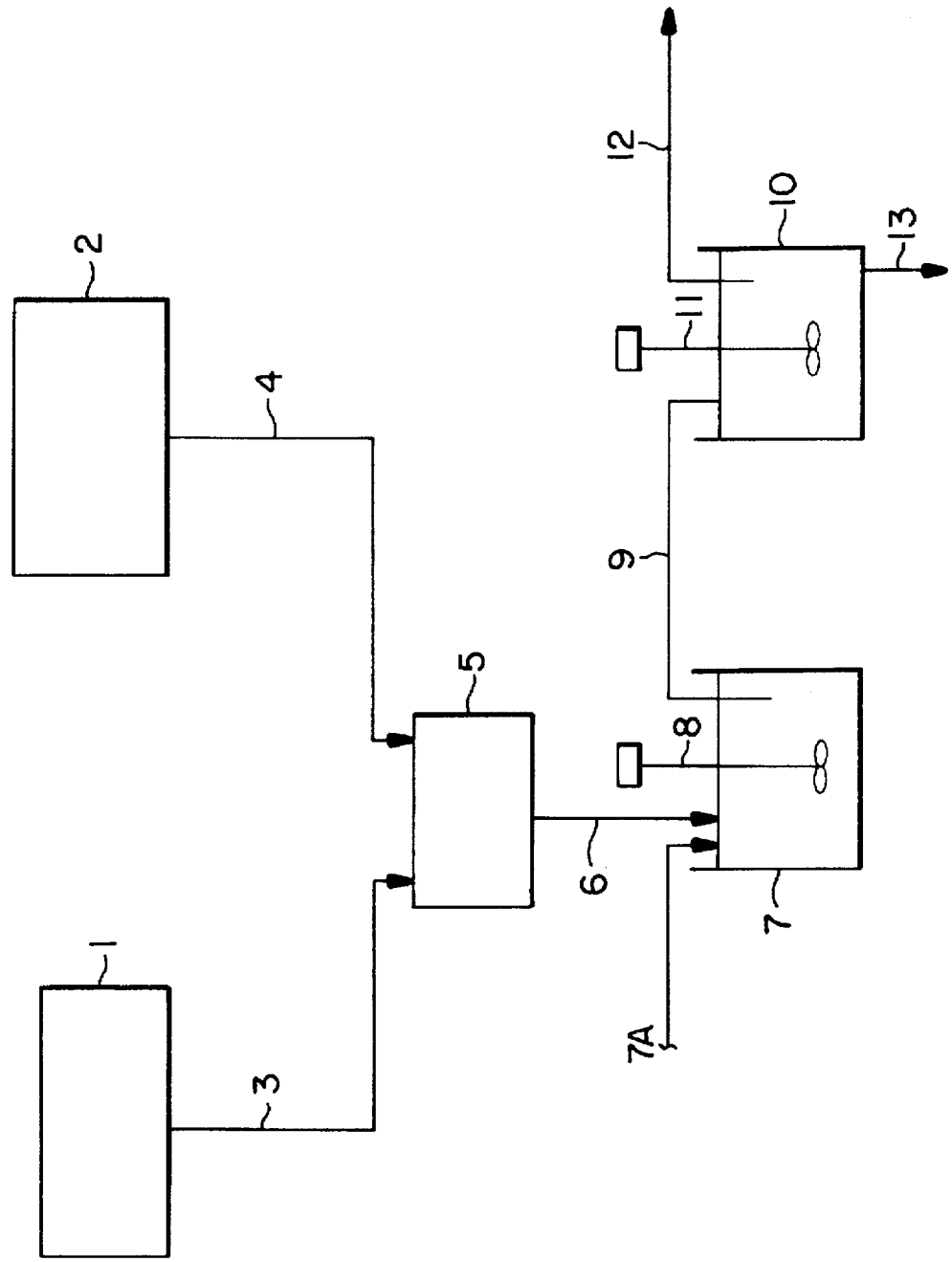

PROCESS FOR THE DETOXIFICATION OF EFFLUENTS CONTAINING FREE OR COMPLEXED CYANIDES

INTRODUCTION AND BACKGROUND

The present invention relates to the process for the detoxification of effluents obtained from a variety of sources including ore processing operations. More particularly, the present invention relates to the use of a source of magnesium ions used to obtain enhanced detoxification of either clear solutions or slurries containing cyanide and/or other oxidizable substances.

Purification of waste waters and recovery of components thereof is of major importance in connection with the protection of the environment. Effluents from a variety of mining operations, particularly effluents from precious metal extraction plants and base metal flotation plants often contain cyanide in various forms together with toxic metals. Effluents from other industries such as electroplating and steel hardening often contain cyanide in various forms such as simple cyanide as well as cyanide complexed with other toxic metals. The detoxification of these toxic substances and the conversion thereof into nontoxic materials is of paramount importance before waste water and other liquids can be discharged in order to avoid serious damage to the environment, the aquatic life as well as adverse impacts on public health and safety.

A number of methods have been developed over the years and are currently available for the treatment of cyanide containing effluents in the form of solutions, slurries and pulps. One of the best known methods for treating effluents containing cyanides and heavy metals such as copper, zinc and nickel involves the oxidation of cyanide contained in the waste water with hydrogen peroxide as well as peroxygen chemicals such as Caro's acid. Heavy metals contained in such wastes are usually removed by precipitation as a part of the overall process. These methods have been used successfully on a commercial scale for a number of years and are known to have a number of advantages over the even older methods such as treatment with chlorine because the excess hydrogen peroxide that is utilized decomposes to give only water and oxygen.

It is known that processes utilizing hydrogen peroxide are sometimes rather slow. Occasionally a catalyst is used such as copper in the $Cu^{2+}$ state in order to accelerate the rate of reaction. For example, U.S. Pat. No. 3,617,567 discloses destruction of cyanide at a pH of 8.3 to 11 using silver, copper, tungates or vanadium in the presence of hydrogen peroxide.

Caro's acid solutions, a mixture of sulfuric acid and peroxide which does cause some salt formation, has extremely quick reaction kinetics, thereby minimizing the need for the capital investments required for tankage to accommodate long reaction times. U.S. Pat. No. 3,239,072 discusses this process.

In the case of effluents arising from ore processing plants, the waste effluent often takes the form of so called tailings pulp or slurry, wherein the proportion of solids may be 50% or even higher. In the treatment of these pulps with hydrogen peroxide or Caro's acid, a relatively large amount of hydrogen peroxide is sometimes required for the treatment. In such cases, the economic viability of the detoxification process depends on reducing the consumption of treatment chemicals, especially peroxygen chemical, as far as possible.

In many situations, the greatest limiting factor on the use of hydrogen peroxide or Caro's acid for the detoxification of a given waste water is the reaction time and the overall cyanide removal effectiveness. While copper accelerates the rate of reaction, it is a toxic heavy metal. Heavy metal content is strictly regulated in waste water discharge permits since they are quite toxic to aquatic organisms. Furthermore, copper may be difficult to remove from solution and even after a removal, the sludge containing heavy metal has to be disposed of.

Several methods have been developed in the past for reducing the amount of hydrogen peroxide. Thus, U.S. Pat. No. 4,416,786 makes use of accurate measurement of oxidizing agent demand and the control of reagent dosage.

U.S. Pat. No. 4,851,129 involves the removal of magnetic materials before the treatment of the pulp ore because magnetic components had been found to cause catalytic decomposition of hydrogen peroxide and a corresponding increase in consumption.

U.S. Pat. No. 4,966,715 discloses the detoxification of effluents containing cyanide by treating the mixture with hydrogen peroxide and phosphoric acid. The system shown in the patent results in a substantial reduction in the consumption of hydrogen peroxide when compared to using hydrogen peroxide alone.

However, in some cases the consumption of hydrogen peroxide is still high, and further reduction in the consumption of hydrogen peroxide and consequently a reduction in the cost of waste water treatment is a worthwhile objective.

One procedure has been described in U.S. Pat. No. 3,900,555, which relies on the preparation of monoperoxysulfuric acid (also known as Caro's acid) using an apparatus described in U.S. Pat. No. 3,939,072, and subsequently adding the monoperoxysulfuric acid to the waste water, while simultaneously adding an alkali to the waste water in an amount suitable for neutralizing the acid.

The known reaction between sulfuric acid and hydrogen peroxide to form monoperoxysulfuric acid is generally depicted as follows:

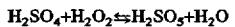

Theoretically, one mole of sulfuric acid reacts with one mole of hydrogen peroxide to yield one mole of monoperoxysulfuric acid. In practice, excess sulfuric acid is added, in order to maximize the amount of monoperoxysulfuric acid present in the equilibrium mixture. Generally, the molar ratios of $H_2SO_4:H_2O_2$ to generate $H_2SO_5$, Caro's acid, are in the range of 0.5–10:1. Typically, 1.5–5.0:1, $H_2SO_4:H_2O_2$, molar ratios are used.

U.S. Pat. No. 4,915,849 discloses the treatment of cyanide containing effluent with a mixture of hydrogen peroxide and sulfuric acid in a certain proportion forming Caro's acid. In that patent it was found that the reduction of the mole ratio of sulfuric acid to hydrogen peroxide below the amounts previously used in the industry resulted in an oxidizing mixture with a performance significantly better than is obtained by mixtures with a higher mole ratio of acid to hydrogen peroxide.

Yet another system for treatment of effluent containing cyanide and toxic metals relying on hydrogen peroxide is shown in U.S. Pat. No. 4,822,496. In this patent, a combination of hydrogen peroxide and trimercaptotriazine is used.

The use of calcium peroxide is illustrated in U.S. Pat. No. 5,262,136 and is said to achieve a more stable compound relative to hydrogen peroxide resulting in control over the rate of oxygen release in treating silver-bearing ore.

Finally, U.S. Pat. No. 5,246,598 discloses a method involving adding a source of silicon oxide to the cyanide containing aqueous waste solution at an alkaline pH and in a certain temperature range together with hydrogen peroxide in order to convert the aqueous waste solution containing cyanide to an aqueous solution containing less toxic materials.

SUMMARY OF THE INVENTION

It is an object of the present invention to provide a method for treatment of waste water containing cyanide and/or toxic metals utilizing hydrogen peroxide, or Caro's acid and hydrogen peroxide, together with magnesium salts to detoxify such waste waters in an efficient and effective manner. More specifically, divalent magnesium ions, $Mg^{2+}$, are utilized in situ to thereby obtain enhanced detoxification. Another object of the invention is to detoxify either clear solutions or slurries or pulps containing either free or complexed cyanides and to covert those undesirable substances into harmless substances more ecologically acceptable than other processes.

In achieving the above and other objects, one feature of the present invention resides in carrying out the treatment of effluent containing cyanide and/or other oxidizable objectionable materials derived from a variety of industries including electroplating, steel hardening, and mining operations containing cyanide in various forms and which may also include toxic metals. The process is carried out by utilizing the aforesaid magnesium ions together with either hydrogen peroxide or a combination of Caro's acid and hydrogen peroxide which results in better detoxification.

BRIEF DESCRIPTION OF THE DRAWING

The present invention will be further understood with reference to the drawings wherein FIG. 1 is a flow diagram showing the process sequence suitable for carrying out the present invention.

DETAILED DESCRIPTION OF THE INVENTION

In carrying out the present invention and as illustrated in FIG. 1, tank 1 contains a source of hydrogen peroxide and tank 2 contains a source of magnesium ion. These are conveyed through lines 3 and 4, respectively, to a tank 5 where they are mixed together and then conveyed by line 6 to the detoxification tank 7 fitted with agitator 8. The effluent 7A is conveyed to the final detoxification tank 7. When a plurality of detoxification tanks are employed, the partially treated effluent is conveyed 9 to a second tank 10 also equipped with an agitator 11. The purified effluent is discharged at 12 and precipitated substances are removed at 13.

When Caro's acid is used, a Caro's acid generator can be placed into the arrangement of equipment, along with sulfuric acid storage.

The source of magnesium ion in a sufficient amount capable of activating the peroxide for the detoxification reaction is added as magnesium sulphate heptahydrate or other magnesium salt to provide magnesium concentration of 0.1 to 1000 mg per liter of aqueous waste in clear solutions or slurry, preferably 25 to 750 mg and more preferably 100 to 500 mg per liter. Magnesium ion added beyond the 1000 mg level reduces the overall efficiency of the cyanide detoxification reaction.

The detoxification reaction involves adding the source of magnesium ion as well as hydrogen peroxide which is then allowed to react with the cyanide and/or toxic material in the effluent. If necessary caustic and/or lime can be used for this purpose.

It is preferred that the hydrogen peroxide be added at a ratio of $H_2O_2$:CN up to 10 to 1, however the ratio of $H_2O_2$ to CN can be as low as 0.1 to 1.

Typical temperatures for the reaction are from 3° C. to 100° C., preferably 10° C. to 60° C. and more preferably 15° to 30° C.

Before, during, after or simultaneous to the addition of the source of magnesium ion to the effluent, there is added the hydrogen peroxide or such other peroxygen compound in sufficient quantity to oxidize any or all of the cyanide present in the clear solution or slurry waste effluent.

Any suitable commercially available source of the magnesium ion as indicated above, such as magnesium sulphate heptahydrate can be used. It is generally added to the aqueous effluent containing the cyanide at a pH of 8 to 13 and at a temperature with range of 3° to 100° C., preferably between 10° C. to 60° C. and more preferably 15° to 30° C.

The source of magnesium ion is added to the waste effluent at a concentration sufficient to provide 0.1 to 1000 mg per liter of aqueous waste in clear solution or slurry, preferably 25 to 750 mg and more preferably 100 to 500 mg per liter.

Other peroxygen compounds that are capable of being a source of peroxide and that can be used include sodium perborate or sodium percarbonate. These substances are well known in the art and are contemplated under the expression "source of hydrogen peroxide".

The concentration of hydrogen peroxide or other peroxygen compound added is from 0.1 to 10 times or more the stoichiometric amount required for the reaction as necessary to achieve the desired reaction rate, preferably 0.5 to 8 times the stoichiometric amount.

Reaction times for peroxide at 10 times the stoichiometric amount is generally one hour or less (15 minutes to 60 minutes) while at five times the stoichiometric amount the reaction time is generally 60 minutes to 180 minutes. This is dependent upon temperature, metals content, cyanide concentration, among other features.

Other peroxygen based processes are significantly quicker such as Caro's acid and which reacts typically in less than 5 minutes.

The method can be carried out as either a batch or continuous process.

In one embodiment of the present invention, the following steps can be carried out for continuous treatment of waste effluent containing cyanide and other contaminants arising from a variety of industrial operations.

The effluent from the industrial process which is intended to be treated typically containing one or more heavy metals and cyanide and which may be a clear solution or slurry or a pulp with up to a 70% solids content is allowed to flow through one or more toxification tanks such as shown in FIG. 1 each equipped with a propeller type stirrer to agitate the effluent. Tanks can be chosen in size and number to provide sufficient reaction time for the oxidation of the contaminants which is typically between five minutes and three hours. The solids content of the effluent can range up to 90%.

The source of the aqueous peroxide which can be, for example, aqueous hydrogen peroxide at a concentration of about 30 to 90%, preferably 70% by weight, and the source of magnesium ion are mixed together before introduction to and contact with the waste effluent. They may also be added separately and allowed to react in situ. The combination of reactants can be accomplished in a number of different ways.

For example, the source of hydrogen peroxide and the source of magnesium ion can be dosed in fixed portions to a relatively small vessel located at a point near the surface of the effluent in the first detoxification tank. The two liquids can be mixed together either using an in line, static mixer or by using the small stirred vessel arranged so that the mixture overflows into the second and larger detoxification tank located in the immediate vicinity of the smaller mixing tank.

A series of reaction vessels can be arranged in cascading relation with each other and with regard to the overall flow from the detoxification tank for completion of the reaction.

It is desirable that all vessels used in the process of the invention be constructed of a material such as glass or stainless steel which is resistant to the chemicals in use.

Normally, the mixing time is somewhat brief; i.e. from one to sixty minutes before the mixture is reacted with the effluent. In the course of mixing together the source of hydrogen peroxide and the magnesium ion the reaction generates heat. Thus, it may be advantageous in some instances to position the mixing vessel so that it is cooled by the effluent and the detoxification tank.

Addition of the source of hydrogen peroxide and the source of the magnesium ion can be controlled manually on the basis of regular analysis of the residual cyanide and the effluent using methods and analysis well known to those skilled in the art.

Automatic control can be achieved using the process, for example, described in U.S. Pat. No. 4,416,786 wherein a continuous titration of a side stream of the effluent with the strong oxidizing agent is used to determine the demand of oxidizing agent. In this case, the continuous titration gives the information required to dose the hydrogen peroxide as well as the magnesium ion to give the required mole ratio to the source of hydrogen peroxide.

The rate of addition of peroxgen chemical - magnesium ion mixture is fixed by the ratio of components and is determined by the flow rate and/or the cyanide concentration of the effluent. If the temperature rises to about 40° to 50° C. then the flow rate of the effluent can be increased to cool the reaction to ambient or slightly higher temperature. Some elevation of the temperature of the effluent is sometimes desirable.

With the source of magnesium ion, it may be unnecessary to add lime slurry or solution in order to maintain the pH between the desired values of 8 to 13. However, if necessary, such materials can be used for this purpose as they assist in precipitation of undesirable materials as is known in the art. Again, the alkalinity can be controlled automatically by a pH electrode and control circuits using methods known to those skilled in the art.

After oxidization of the cyanide and other oxidizable pollutants has been satisfactorily completed, further steps can be carried out in order to further purify the effluent. Such steps include but are not limited to the addition of copper (II) salts to precipitate ferrocyanide ions or iron (III) salts or the modification of the pH by addition of acids or alkali.

After treatment, the effluent containing the precipitated materials may be allowed to flow under gravity or may be pumped to a pond in which the solids separate out. The supernatant water may be discharged to the environment or reclaimed for use in the industrial processing operation. Metal content of the precipitate can be recovered by known methods.

In another embodiment of the present invention the detoxification can be carried out on a batch basis. Such method is suitable in cases where smaller quantities of cyanide containing effluent are produced, as for example from steel hardening shops or electroplating operations. In such cases, a detoxification tank may be filled with effluent and agitated with a propeller type stirrer. This same detoxification steps can be carried out as previously described.

At the end of the treatment the effluent may be filtered to remove solids which may contain toxic substances such as heavy metal salts and the liquid discharged to the environment. The filter cake may be disposed of in a suitable land fill.

The following examples from the field of effluent treatment are illustrative and are not intended to limit the invention. This clear solution effluent contained 516 ppm CNwad before treatment.

|  |  |  | Results After Treatment | |
| --- | --- | --- | --- | --- |
| Test No. | Mole Ratio $(H_2O_2:CN)$ | $MgSO_4$ Addition (ppm $Mg^{+2}$) | CNwad (ppm) | pH |
| 1 | 2.45:1.00 | — | 214.4 | 12.7 |
| 2 | 2.45:1.00 | 100 | 76.0 | 12.4 |

A second mining effluent which was a clear solution analyzing 29 ppm weak acid dissociable cyanide and pH 10.2 responded to magnesium peroxide treatment as follows:

|  |  |  | Results After Treatment | | |
| --- | --- | --- | --- | --- | --- |
| Test No. | Mole Ratio $(H_2O_2:CN)$ | $MgSO_4$ Addition (ppm $Mg^{+2}$) | CNwad (ppm) | Cu (ppm) | pH |
| 3 | 3.00:1.00 | — | 0.40 | — | 9.4 |
| 4 | 3.00:1.00 | 50 | 0.13 | 0.21 | 9.4 |
| 5 | 3.00:1.00 | 100 | 0.59 | 0.19 | 9.4 |
| 6 | 3:00:1.00 | 200 | 0.17 | 0.19 | 8.7 |
| 7 | 3:00:1.00 | 400 | 0.19 | 0.11 | 9.4 |

The third sample treated was 50% ground ore, 50% water (i.e., 50% solids) slurry mining effluent. A Caro's acid solution made by mixing a 2:1 molar ratio of $H_2SO_4$ and $H_2O_2$, was used as the peroxygen source in this case. The sample contained 100 ppm CNwad per liter of solution. The initial pH was 11.0.

|  |  |  |  | Results After Treatment | |
| --- | --- | --- | --- | --- | --- |
| Test # | Mole Ratio $(H_2SO_4:H_2O_2)$ | Mole Ratio $(H_2O_2:CN)$ | $MgSO_4$ Addition (ppm $Mg^{3+}$) | CNwad (ppm) | pH |
| 8 | 2.00:1 | 0.5:1 | — | 47.6 | 10.0 |
| 9 | 2.00:1 | 0.5:1 | 25 | 40.8 | 10.0 |
| 10 | 2.00:1 | 0.5:1 | 50 | 26.2 | 9.8 |
| 11 | 2.00:1 | 0.5:1 | 100 | 24.5 | 9.7 |

The results indicate that magnesium ion that is $Mg^{+2}$ helps the detoxification of clear solutions or slurries that contain free or complexed cyanides.

Further variations and modification of the invention will be apparent to those skilled in the art from the foregoing and are intended to be encompassed by the claims appended hereto.

We claim:

1. A process for treating effluent containing cyanide comprising:

contacting said effluent with a mixture formed from a source of hydrogen peroxide and a source of magnesium ion in a sufficient amount to oxidize the cyanide wherein the ratio of hydrogen peroxide to cyanide is up to 10:1 and the amount of magnesium ion is present in the concentration of 0.1 to 1000 mg per liter of effluent.

2. The process of claim 1 wherein the ratio of hydrogen peroxide to cyanide is 0.1–10 $H_2O_2$ to 1 CN.

3. The process according to claim 1 further including the step of maintaining the effluent at a pH between 8 and 13.

4. The process according to claim 1 wherein the cyanide is in the form of a free or complexed cyanide anion.

5. The process according to claim 1 wherein the source of hydrogen peroxide is a Caro's acid solution.

6. A process for controlling the content of oxidizable cyanide impurity in an aqueous effluent medium to an environmentally acceptable level comprising:

adding a sufficient amount of a source of hydrogen peroxide and a sufficient amount of a source of magnesium ion to form a reaction mixture containing $Mg^{+2}$ and allowing the reaction mixture to contact the aqueous effluent medium having an oxidizable impurity therein for a period of time of no more than 60 minutes after said reaction mixture is formed, the ratio of hydrogen peroxide to cyanide being between 0.1–10 moles to 1.

7. The process according to claim 6 further comprising adding alkaline material to the aqueous medium in a quantity controlled to maintain the pH of the effluent between 8 and 13.

8. The process in accordance with claim 6 wherein the oxidizable impurity is cyanide in the form of a free or complexed cyanide anion.

9. The process according to claim 6 wherein the source of hydrogen peroxide is a Caro's acid solution.

10. A process for treating effluent containing cyanide comprising:

contacting said effluent with a mixture formed from a source of hydrogen peroxide and a source of magnesium ion in a sufficient amount to oxidize the cyanide, wherein the ratio of hydrogen peroxide to cyanide is up to 10:1 and the amount of magnesium ion is present in the concentration of 0.1 to 1000 mg per liter of effluent, wherein the source of magnesium ion is magnesium sulfate heptahydrate.

11. A process for controlling the content of oxidizable cyanide impurity in an aqueous effluent medium to an environmentally acceptable level comprising:

adding a sufficient amount of a source of hydrogen peroxide and a sufficient amount of a source of magnesium ion to form a reaction mixture containing $Mg^{+2}$ and allowing the reaction mixture to contact the aqueous effluent medium having an oxidizable impurity therein for a period of time of no more than 60 minutes after said reaction mixture is formed, the ratio of hydrogen peroxide to cyanide being between 0.1–10 moles to 1, wherein the source of magnesium ion is magnesium sulphate heptahydrate.

* * * * *